United States Patent [19]

Saito et al.

[11] Patent Number: 5,940,432
[45] Date of Patent: Aug. 17, 1999

[54] SPREAD SPECTRUM RADIOCOMMUNICATION DEVICE UTILIZING RAKE RECEPTION SCHEME

[75] Inventors: Naritoshi Saito, Tokyo; Hironori Yoshida, Sagamihara, both of Japan

[73] Assignee: Kabushiki Kaisha Toshiba, Kawasaki, Japan

[21] Appl. No.: 08/689,347

[22] Filed: Aug. 8, 1996

[30] Foreign Application Priority Data

Aug. 11, 1995 [JP] Japan ................................. 7-205687

[51] Int. Cl.⁶ .................................................. H04B 1/707
[52] U.S. Cl. .................................................. 375/206
[58] Field of Search ..................... 375/200, 206, 375/207, 208, 209, 210, 349, 367

[56] References Cited

U.S. PATENT DOCUMENTS

| | | | |
|---|---|---|---|
| 4,653,069 | 3/1987 | Roeder ........................................ | 380/31 |
| 4,817,148 | 3/1989 | Lafferty et al. ............................ | 380/48 |
| 5,109,390 | 4/1992 | Gilhousen et al. ........................ | 370/335 |
| 5,177,766 | 1/1993 | Holland et al. ........................... | 375/206 |
| 5,271,034 | 12/1993 | Abaunza .................................... | 375/200 |
| 5,490,165 | 2/1996 | Blakeney, II et al. ................... | 370/335 |
| 5,577,022 | 11/1996 | Padovani et al. ........................ | 370/332 |
| 5,581,547 | 12/1996 | Umeda et al. ............................ | 370/342 |
| 5,689,525 | 11/1997 | Takeishi et al. ......................... | 375/206 |
| 5,699,380 | 12/1997 | Sugita ....................................... | 375/208 |

*Primary Examiner*—Stephen Chin
*Assistant Examiner*—Jeffrey W. Gluck
*Attorney, Agent, or Firm*—Banner & Witcoff, Ltd.

[57] ABSTRACT

A spread spectrum radiocommunication device includes a plurality of digital data demodulators which are independently operated to track the paths of a multipath radio signal transmitted from a to-be-communicated device and PN code generators each of which has a ROM storing PN codes and which are respectively provided in the digital data demodulators. In a control section, a ROM address latched by an address latch circuit is monitored and a PN address relative value is generated, and the PN address relative value is added to a basic address generated from an address counter in an address adder and the added address is supplied to the PN code ROM to generate a PN code.

18 Claims, 9 Drawing Sheets

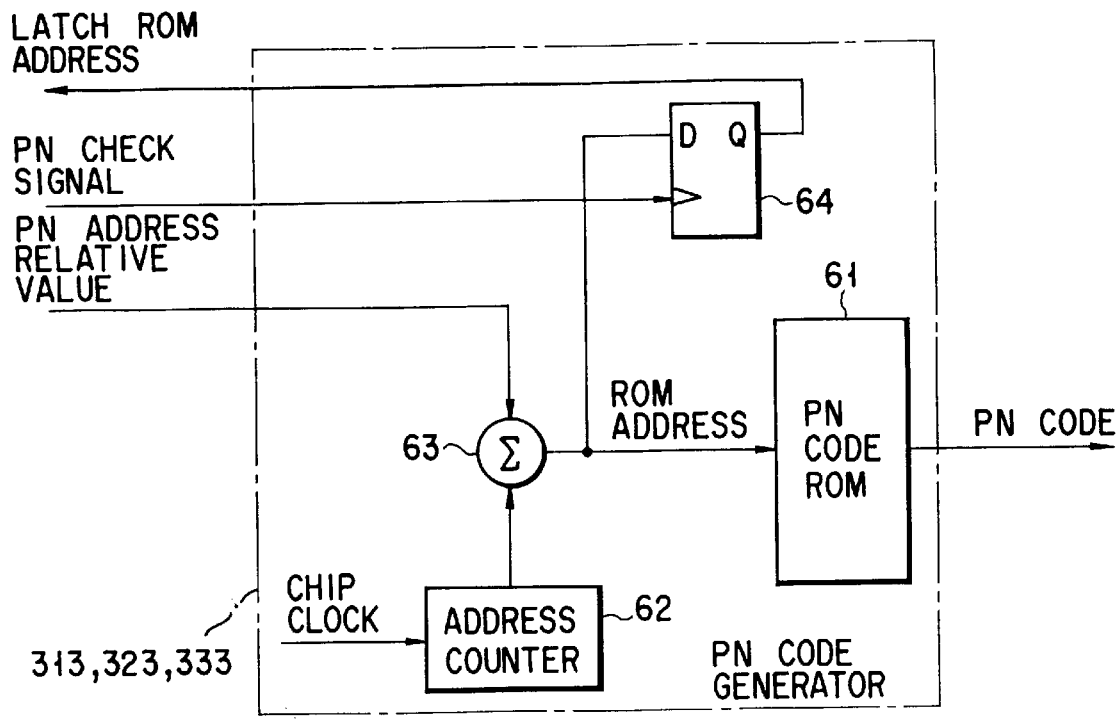
F I G. 2
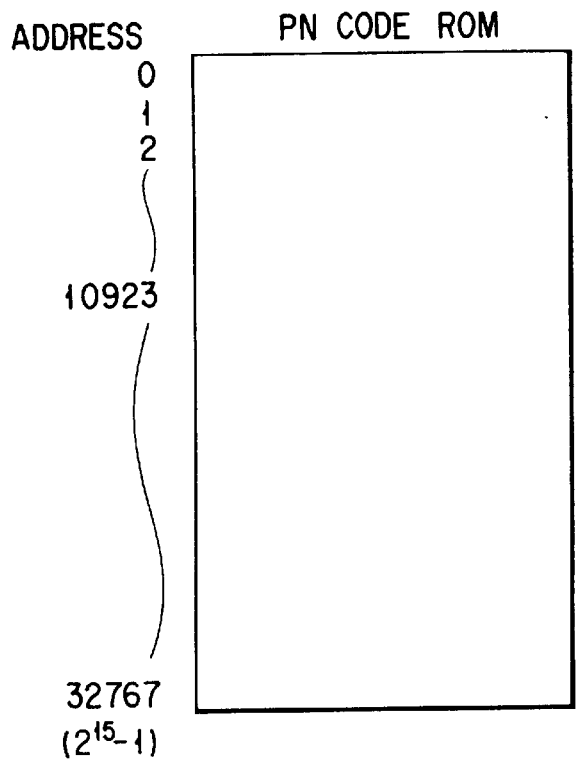
F I G. 3

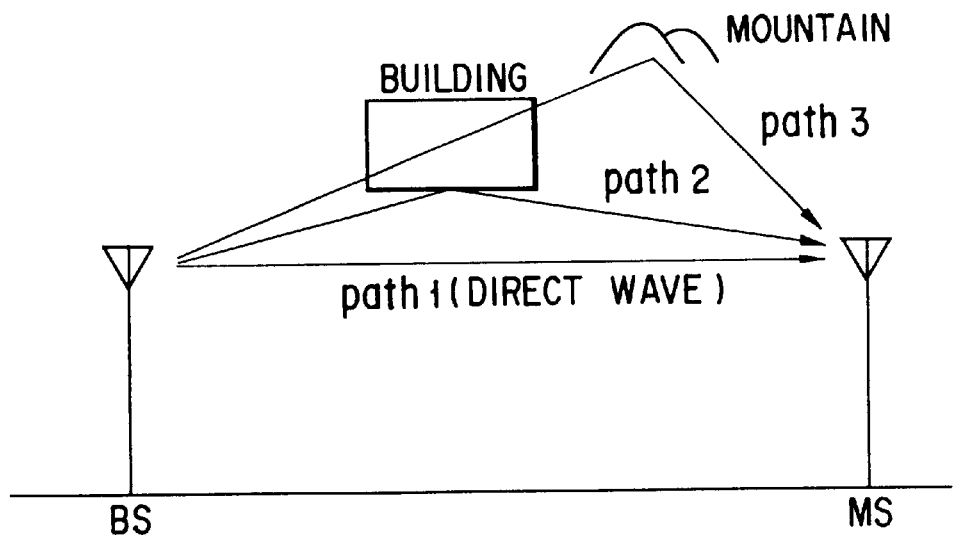
F I G. 4
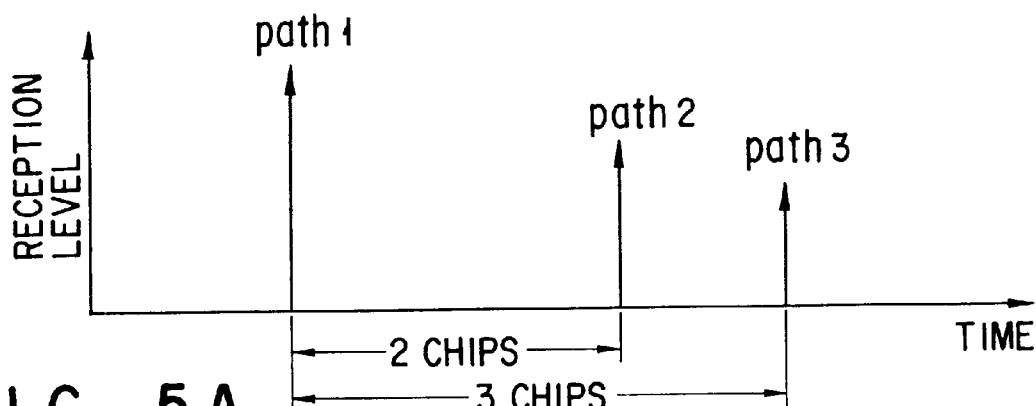
F I G. 5A
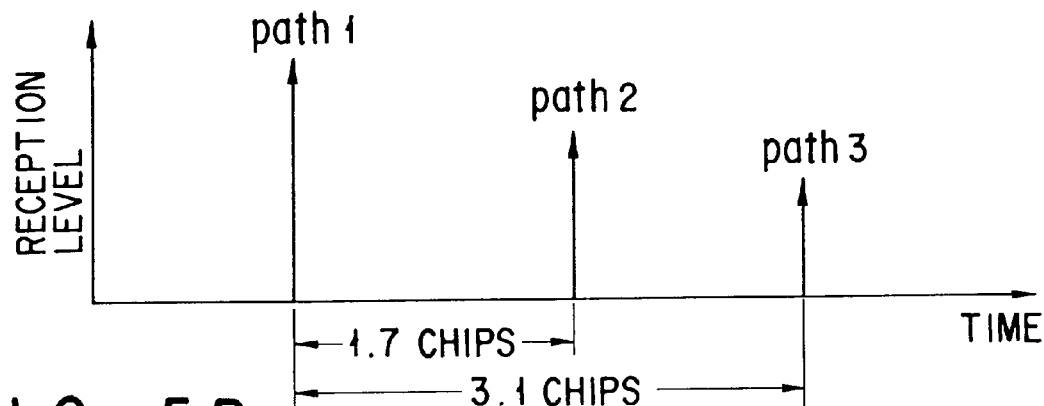
F I G. 5B

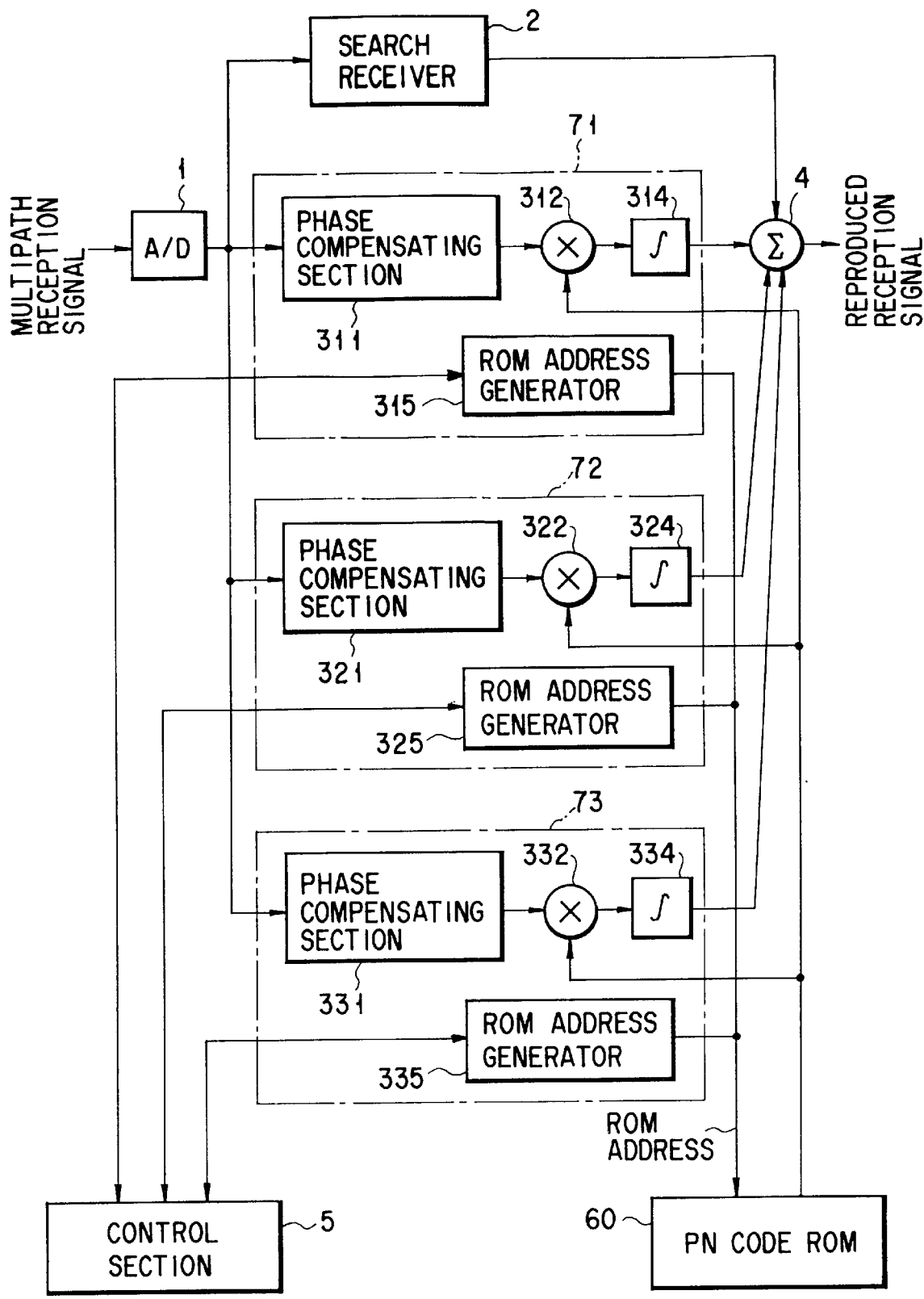
F I G. 7

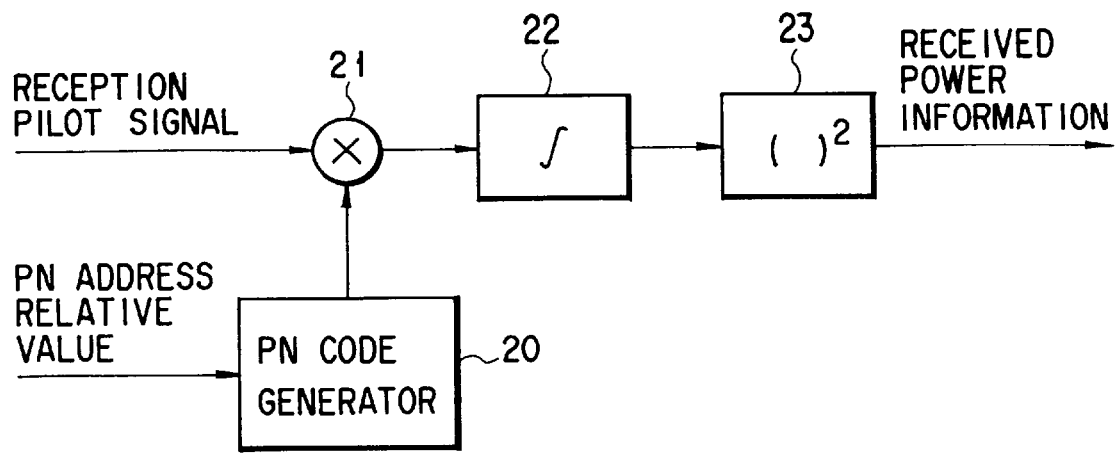
F I G. 9
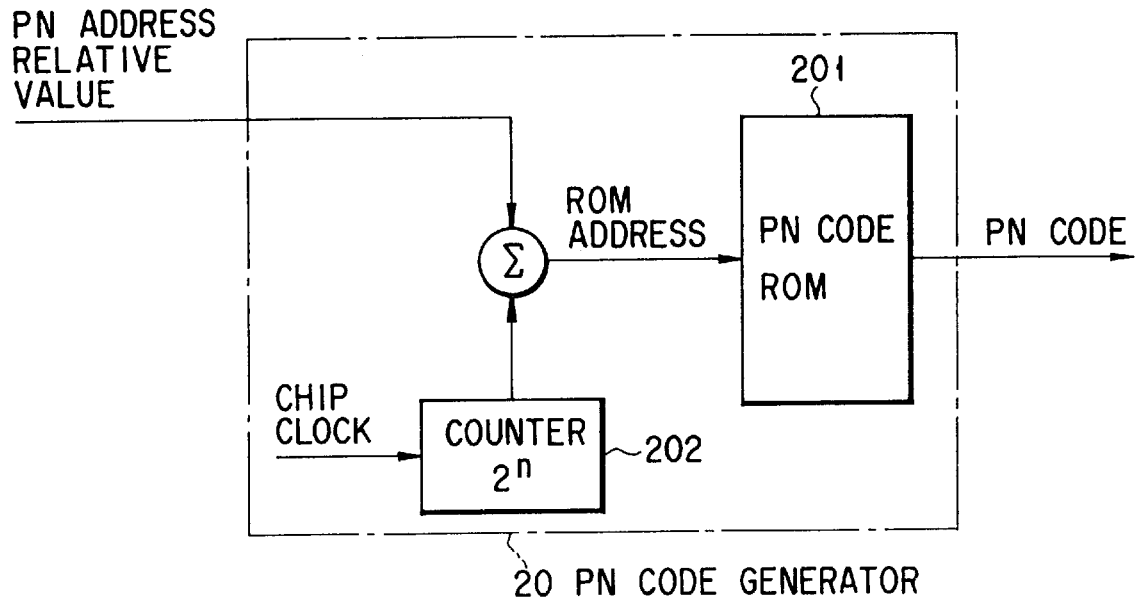
F I G. 10

PN CODE
CORRELATION
OUTPUT

PN CODE "Early"
CORRELATION
OUTPUT

PN CODE "Late"
CORRELATION
OUTPUT

"Early-Late"
CORRELATION
OUTPUT

SPREAD SPECTRUM RADIOCOMMUNICATION DEVICE UTILIZING RAKE RECEPTION SCHEME

BACKGROUND OF THE INVENTION

1. Field of the Invention

This invention relates to a radiocommunication device used in a digital mobile communication system such as a mobile telephone system, cordless telephone system or radio local area network (LAN) system, for example, and more particularly to a device utilizing a spread spectrum communication system.

2. Description of the Related Art

In recent years, a spread spectrum communication system which is hardly affected by interference or disturbance has received much attention as one communication system applied to the mobile communication system.

The spread spectrum communication system is used to realize a CDMA (Code Division Multiple Access) system. In the transmission side device, the CDMA system modulates digitized audio data or image data based on the digital modulation scheme such as the PSK modulation scheme, converts the modulated transmission data into a wide-band base band signal by use of a spread code such as a pseudo-random noise code (PN code), then up-converts the signal to a radio frequency signal and transmits the radio frequency signal. In the reception side device, the received radio frequency signal is down-converted to a signal of intermediate frequency or base band frequency, then the signal is subjected to the inverse spreading process by use of the same code as the spread code used in the transmission side device, the signal is subjected to the digital demodulation based on the digital demodulation scheme such as the PSK demodulation scheme, and thus the reception data is reproduced.

In the above type of system, a RAKE reception scheme is used as one of the measures for coping with multipath. That is, in the mobile communication system, the radio carrier wave transmitted from the transmission side device may directly reach the reception side device or reach the reception side device after being reflected from buildings or mountains. If one radio carrier wave reaches the reception side device via a plurality of paths, the radio carrier waves transmitted via the plurality of paths are vectorially synthesized at the antenna end portion of the reception side device, thereby lowering the reception level. This phenomenon is called the multipath. If the multipath occurs, the radio signal cannot be received at all by the reception device in some cases in a system in which the bandwidth of the radio channel is approximately 30 kHz and narrow, for example. However, in the spread spectrum communication system, since the bandwidth of the radio channel is wide, the radio signal can always be received although it is partly lost.

Therefore, in the spread spectrum radiocommunication system, a RAKE reception scheme is used. The RAKE reception scheme has a plurality of independent demodulators and separates a multipath reception signal received by one antenna for each spread code length (one chip) unit and supplies the same to the demodulators. Then, the reception signal is demodulated by effecting the inverse spreading process by use of spread codes for the respective paths in the respective demodulators and reception data is reproduced by synthesizing the symbols of the demodulated reception signals in the plurality of paths. The path diversity can be effected by using the RAKE reception scheme. Therefore, the reception quality can be significantly enhanced when the multipath occurs.

However, in the conventional RAKE reception scheme, when spread codes of chip phases synchronized with the phases of the respective paths are allotted to the respective demodulators, spread codes generated from a common spread code generator are delayed by necessary chip numbers by use of a delay circuit and then allotted, for example. That is, the chip phase of the spread code is set to an optimum value by changing the delay amount of the delay circuit. Therefore, it is difficult to precisely set the chip phase. Further, the delay circuit is generally constructed by shift registers. Therefore, the maximum value of the delay amount is determined by the number of stages of the shift registers and the circuit scale is increased if the maximum value of the delay amount is further increased.

SUMMARY OF THE INVENTION

An object of this invention is to provide a spread spectrum radiocommunication system which is simple in construction and which can easily and precisely synchronize the chip phase of a spread code series with the reception phase of a received multipath radio signal and attain a sufficiently high RAKE reception effect.

In order to attain the above object, a spread spectrum radiocommunication system according to this invention comprises a plurality of readout address generators respectively provided for a plurality of digital data demodulators. Then, readout addresses are generated from the respective readout address generators and supplied to spread code storing means and a spread code series is read out from the spread code storing means starting from a desired chip phase and supplied to a corresponding one of the digital data demodulators. Further, address control means is provided. The readout addresses generated from the readout address generating means are changed by the address controller so that the chip phases of the spread code series respectively supplied from the spread code storing means to the plurality of digital data demodulators will coincide with the reception phases of respective paths to be tracked.

The address controller fetches the readout addresses generated from the plurality of readout address generators at desired timings, derives readout address relative values corresponding to differences between the respective fetched readout addresses and target readout addresses corresponding to the reception phases of the respective paths to be tracked and supplies the readout address relative values to the respective readout address generators. Each of the readout address generators adds the readout address relative value supplied from the address controller to a basic address generated from a basic address generator and supplies the added value to the spread code storing means as a changed readout address.

Therefore, according to this invention, spread code series are sequentially read out from the spread code storing means starting from a desired chip phase by address designation and respectively supplied to the digital data demodulators. Thus, it becomes possible to supply spread code series of different and optimum chip phases to the plurality of digital data demodulators by adequately designating a readout address. Therefore, the chip phase of the spread code supplied to the digital data demodulators can be precisely synchronized with the reception phase of each path of the multipath radio signal by use of simple construction.

Further, the target readout address corresponding to the reception phase of each path to be tracked is created based on the result of reception of a pilot signal transmitted from the transmission side. As a result, the reception phase of each path can be easily and precisely detected by utilizing an existing pilot signal.

Further, the reception phase of a path to be tracked is not synchronized with the chip phase of the spread code series in some cases. In this case, the reception phase of the path is approximated to the chip phase of the spread code series and a target readout address corresponding to the approximate value of the reception phase is created. When the readout address of the spread code series is controlled by use of the approximated target readout address, the chip phase of the spread code series is not completely synchronized with the reception phase of the path if no particular measure is taken. However, if clock tracking means is provided and used to compensate for a phase difference of less than one chip between the chip phase of the spread code series and the reception phase of the path to be tracked, the synchronization with high precision can be attained.

Further, the spread code series may be stored in each address area of the spread code storing means not bit by bit but in the unit of n bits. Then, the parallel spread code series of n bits read out from the spread code storing means may be supplied to the signal converter and the parallel spread code of n bits may be serially output bit by bit from a desired bit position in the signal converter. With this construction, the storage capacity of the memory for storing the spread code series can be reduced, thereby making it possible to lower the cost of the memory.

Further, it is possible to provide a common spread code memory for the plurality of readout address generators and cause readout addresses to be generated at independent timings from the respective readout address generators and supplied to the common memory. With this construction, the number of spread code memories can be set to one and the total number of memories can be reduced to reduce the scale of the circuit and lower the cost thereof. Further, the common memory is accessed by the respective readout address generators at independent timings. That is, it is accessed in a time sharing fashion. Therefore, even if one common memory is commonly used by the plurality of readout address generators, the possibility of causing a problem in the access operation is weak.

It is considered that collision of accesses will occur in a rare case if one common memory is commonly used by the plurality of readout address generators. However, the problem can be solved by providing an arbitration circuit in the spread code memory or on the address bus for the memory.

Further, this invention has initial capturing means and clock tracking means provided in at least one of the plurality of digital data demodulators. The correlation output level of the spread code series with respect to a reception signal on a desired path is monitored by the initial capturing means so as to detect the chip phase of the spread code series which causes the correlation output level to be set higher than a preset level. When the chip phase of the spread code which causes the correlation output level to be set higher than a preset level is detected by the initial capturing means, the clock tracking means starts the clock tracking operation to control at least one of the frequency and phase of the clock used by the readout address generators so as to increase the output level of correlation between the spread code series and the reception signal to a maximum value.

With the above construction, the spread code synchronization system of this invention can be applied to the initial capturing operation by the digital data demodulators.

Further, it is possible to divide the memory area of the spread code storing means into a plurality of divided memory areas corresponding in number to the readout address generators, access the divided memory areas in parallel by the readout address generators to read out spread code series from the divided memory areas, and effect the initial capturing operation and clock tracking operation in parallel by use of the readout spread code series. With this construction, the operation of capturing the chip phase of the spread code series is shared and effected in parallel by the plurality of digital data demodulators. Therefore, the average time required for synchronization and capturing can be reduced in comparison with a case wherein the synchronizing and capturing operation is effected by use of only one digital data demodulator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a circuit block diagram showing the construction of a PN code generator in the device of FIG. 1;

FIG. 3 is a diagram showing a memory space of a PN code ROM provided in the PN code generator shown in FIG. 2;

FIG. 4 is a schematic view showing one example of a multipath;

FIG. 5A is a diagram showing one example of the reception state of radio wave via a multipath;

FIG. 5B is a diagram showing another example of the reception state of radio wave via a multipath;

FIG. 7 is a circuit block diagram showing the construction of a main portion of the reception system of a spread spectrum radiocommunication device according to a second embodiment of this invention;

FIG. 9 is a circuit block diagram showing the construction of a search receiver of a spread spectrum radiocommunication device according to a third embodiment of this invention;

FIG. 10 is a circuit block diagram showing the construction of a PN code generator in the search receiver shown in FIG. 9;

DETAILED DESCRIPTION OF THE PREFERRED EMBODIMENTS

First Embodiment

Figure 1:
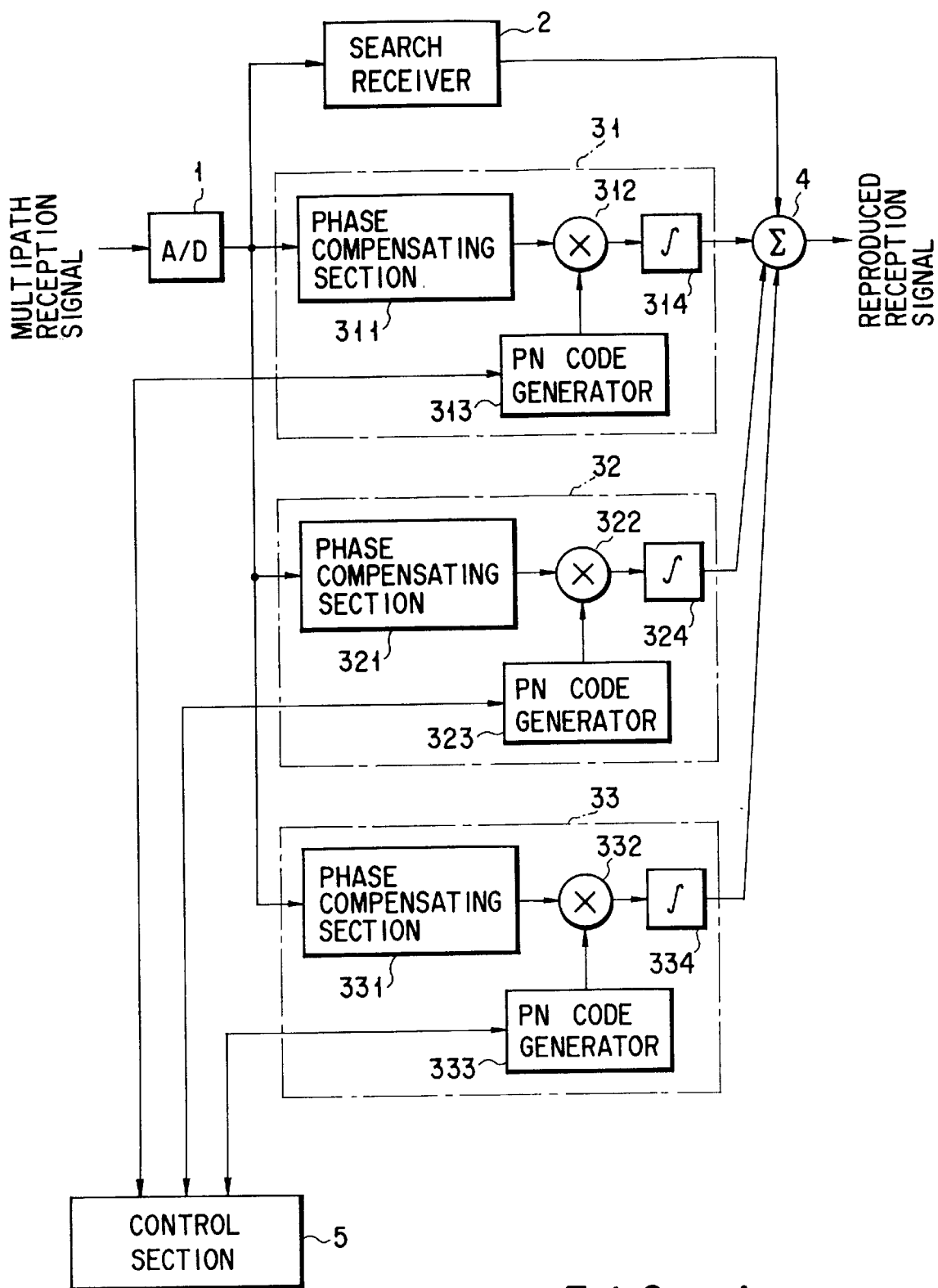
FIG. 1 is a circuit block diagram showing the construction of a main portion of the reception system of a spread spectrum radiocommunication device according to a first embodiment of this invention.

FIG. 1 is a circuit block diagram showing the construction of a main portion of the reception system of a spread spectrum radiocommunication device according to a first embodiment of this invention.

A multipath radio signal wave transmitted from a base station (not shown) via a radio channel is received by an antenna (not shown) and then input to an analog receiver in which the radio frequency thereof is down-converted to a base band frequency. The reception base band signal (multipath reception signal) output from the receiver is converted into a digital form in a preset sampling period by an analog/digital (A/D) converter 1 and then input to a search receiver 2 and three digital data demodulators 31, 32, 33. The reason why three digital data demodulators are provided is to receive the multipath reception signal with high SN ratio by use of the path diversity and effect the so-called soft hand-off in which the base station to be connected is changed during the communication without interrupting the radio channel.

The search receiver 2 receives and demodulates a pilot signal transmitted from the base station and basically has the same construction as that of the digital data demodulators 31, 32, 33.

Each of the digital data demodulators 31, 32, 33 creates an inherent clock by using the sampling clock of the A/D converter 1 as a reference clock and is operated independently from the other digital data demodulators according to the inherent clock, and includes an initial capturing section, clock tracking section and data demodulating section. Among them, the data demodulating section includes a phase compensating section 311, 321 or 331, multiplier 312, 322 or 332, PN code generator 313, 323 or 333, and accumulator 314, 324 or 334.

In each of the phase compensating sections 311, 321, 331, the reception signal is subjected to the phase compensation for time diversity. In each of the multipliers 312, 322, 332, the reception signal output from the phase compensating section 311, 321 or 331 is multiplied by a PN code generated from the PN code generator 313, 323 or 333 so as to effect the spectrum inverse spreading of the reception signal. In each of the accumulators 314, 324, 334, the reception signal subjected to the inverse spreading process and output from the multiplier 312, 322 or 332 is integrated and an integrated output is supplied to a symbol synthesizer 4.

The symbol synthesizer 4 combines the integrated outputs of the reception signals output from the digital data demodulators 31, 32, 33 to reproduce a data component. Then, the reproduced data component is supplied to a data determining section (not shown). The data determining section reproduces reception data by determining the level of the reproduced data component, for example.

Each of the PN code generators 313, 323, 333 is constructed as follows. FIG. 2 is a circuit block diagram showing the construction thereof. That is, each of the PN code generators 313, 323, 333 includes a PN code ROM 61, address counter 62, address adder 63 and address latch circuit 64.

In the PN code ROM 61, PN codes which are previously determined with respect to the base stations are sequentially stored for each chip unit starting from the address "0". For example, the period $2^n$ of the PN code is set to $2^{15}$. FIG. 3 shows the construction of the memory space.

The address counter 62 generates a basic address which changes from 0 to $(2^{15}-1)$ by counting the chip clock independently created in a corresponding one of the digital data demodulators 31, 32, 33.

The address adder 63 adds the PN address relative value supplied from a control section 5 which will be described later to a basic address output from the address counter 62. The address obtained as the result of addition is supplied to the PN code ROM 61.

The address latch circuit 64 latches a ROM address output from the address adder 63 when a PN check signal is supplied from the control section 5 and outputs the ROM address to the control section 5. The PN check signal is commonly supplied from the control section 5 to the three digital data demodulators 31, 32, 33.

The control section 5 includes a microcomputer as a main control section, for example. The control function of the control section 5 relating to RAKE reception includes a path position detecting function of detecting the position of the multipath, a ROM address monitoring function and a ROM address change control function.

The path position detecting function is to detect the time positions of a plurality of paths constructing the multipath based on a pilot signal received by the search receiver 2. The ROM address monitoring function is to supply PN check signals to the three digital data demodulators 31, 32, 33 at desired timings so as to cause the present ROM addresses to be latched therein. Further, the latched ROM addresses are read out from the digital data demodulators 31, 32, 33 and paths which the digital data demodulators 31, 32, 33 track at present are determined.

The ROM address change control function is to derive optimum PN address relative values for the respective digital data demodulators 31, 32, 33 based on the result of detection of the path positions by the path position detecting function and the present path positions determined by the ROM address monitoring function. Then, the thus derived PN address relative values are respectively supplied to the PN code generators 313, 323, 333 of the digital data demodulators 31, 32, 33.

Next, the operation of the device with the above construction is explained.

Assume now that a multipath as shown in FIG. 4 occurs between the base station BS and the mobile station MS during the communication. That is, in the mobile station MS, the radio wave is directly received via a first path P1 and reflected waves reflected from a building and reflected waves reflected from a mountain are received via second and third paths P2 and P3, respectively.

Figure 6:
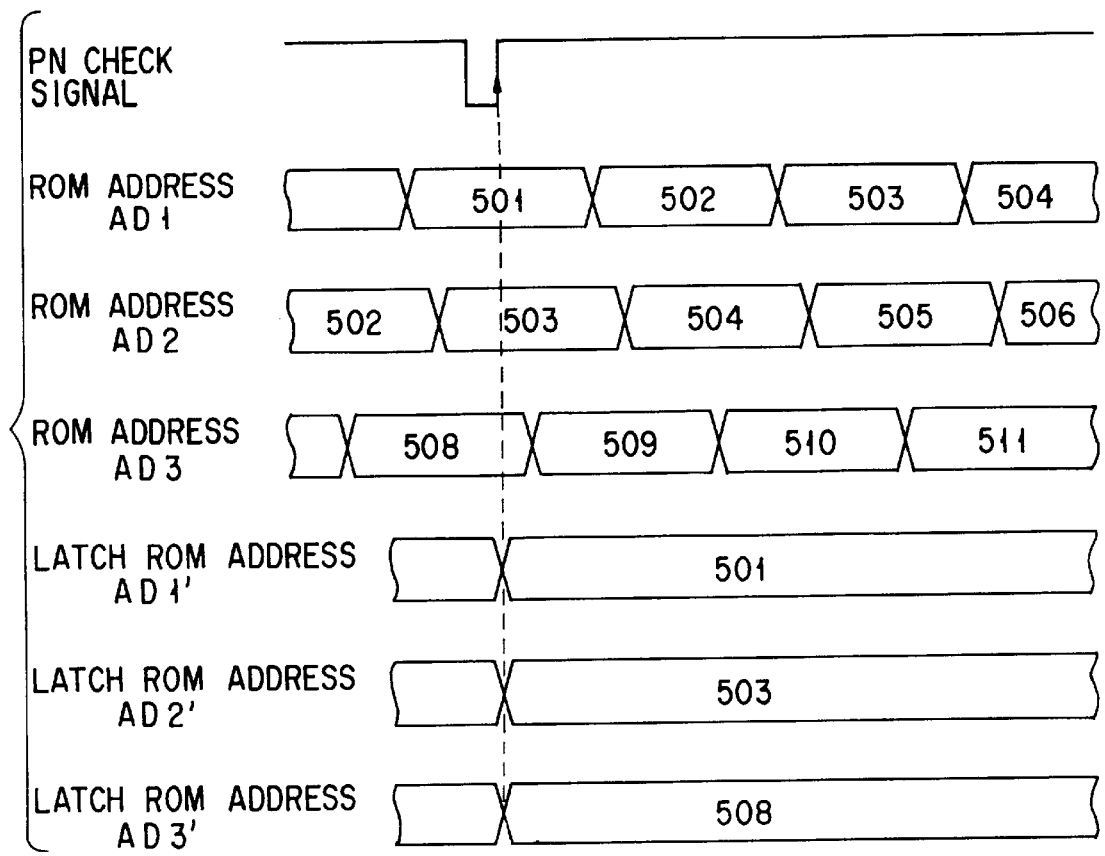
FIG. 6 is a timing diagram for illustrating the operation of the PN code generator shown in FIG. 2.

At this time, in the digital data demodulators 31, 32, 33, ROM addresses AD1, AD2, AD3 for the respective paths P1, P2, P3 are supplied to the PN code ROM 61 as shown in FIG. 6.

Assume that the state of the multipath is changed in this condition. A change in the state of the multipath is detected by the search receiver 2. That is, in the search receiver 2, the pilot signal transmitted from the base station BS is received and demodulated and the demodulated signal is supplied to the control section 5. The control section 5 determines the relative positions of the paths P1, P2, P3 based on the demodulated signal of the pilot signal. For example, assume now that the reception timings of the pilot signal in the paths P1, P2, P3 are set in such a relation as shown in FIG. 5A. In this case, the positions of the paths P2 and P3 with respect to the path P1 are determined to be set in positions respectively delayed by two chips and three chips of the PN code.

Further, at this time, the control section 5 supplies a PN check signal to the digital data demodulators 31, 32, 33 to determine the present ROM addresses AD1, AD2, AD3 in the digital data demodulators 31, 32, 33. Then, at the time of rise of the PN check signal as shown in FIG. 6, the ROM addresses AD1, AD2, AD3 at this time are latched in the PN code generators 313, 323, 333 of the digital data demodulators 31, 32, 33. In the example of FIG. 6, "501", "503" and "508" are latched.

The control section 5 fetches the latched ROM addresses AD1', AD2', AD3' and determines the positions of the paths which the digital data demodulators 31, 32, 33 track at this time based on the latched ROM addresses AD1', AD2', AD3'. The example of FIG. 6 shows a case wherein the digital data demodulator 31 tracks the leading wave, the digital data demodulator 32 tracks a path which is separated from the leading wave by (503−501=2) chips, and the digital data demodulator 33 tracks a path which is separated from the leading wave by (508−501=7) chips.

Next, the control section 5 compares the position of the path which each of the digital data demodulators 31, 32, 33 tracks at present with the newest path position detected based on the result of reception of the pilot signal. In this case, the position of the path (which is separated from the path of the leading wave by seven chips) which the digital data demodulator 33 tracks at present is different from the position (which is separated from the path P1 of the leading wave by three chips) of the newest path P3 detected by the pilot signal. Therefore, the ROM address is controlled to change the position of the path to be tracked by the digital data demodulator 33.

For example, assume now that the PN address relative value supplied to the digital data demodulator 33 is "52". In this case, in order to cause the digital data demodulator 33 tracking the path separated from the leading wave by seven chips to track the path separated by three chips, the PN address relative value may be changed to 52−(7−3)=48 and supplied to the PN code generator 333 of the digital data demodulator 33.

Therefore, in the PN code generator 333 of the digital data demodulator 33, the PN address relative value input to the address adder 63 is changed from "52" to "48". As a result, the ROM address output from the address adder 63 is changed according to the PN address relative value "48". Therefore, the chip position of the PN code read out from the PN code ROM 61 of the digital data demodulator 33 is shifted to a value corresponding to the new ROM address, and after this, the inverse spreading process for the reception signal is effected according to the new PN code whose chip position is changed in the digital data demodulator 33. That is, the path which the digital data demodulator 33 tracks is instantaneously shifted by four chips.

In the above explanation, a case wherein the distances between the path P1 and the paths P2, P3 are set to 2 chips and 3 chips which are the multiples of the chip of the PN code is explained. However, the distance between the paths is not always set to the integral multiple of the chip of the PN code. For example, as shown in FIG. 5B, a case wherein the distances between the path P1 and the paths P2, P3 are set to 1.7 chips and 3.1 chips may occur.

In the above case, for example, the distance between the paths may be rounded and approximated to an integral multiple of the chip of the PN code and the PN address relative value is changed to separate the path by the approximated chip number. As a result, the phases of the PN codes generated from the PN code generators 313, 323, 333 will not be set to the precise positions of the paths which the digital data demodulators 31, 32, 33 track immediately after the change of the ROM address. However, each of the digital data demodulators 31, 32, 33 has a clock tracking section and the phases of the PN code and the reception signal are relatively and gradually adjusted by the tracking operation of the clock tracking section so as to precisely coincide with each other.

As described above, in this embodiment, the three digital data demodulators 31, 32, 33 tracking the paths P1 to P3 are constructed to be independently operated. Further, the PN code generators 313, 323, 333 are provided in the respective digital data demodulators 31, 32, 33 and the ROM 61 storing the PN codes, the address generator constructed by the address counter 62 and address adder 63, and the address latch circuit 64 are provided in each of the PN code generators 313, 323, 333. In the control section 5, the ROM address latched by the address latch circuit 64 is monitored and a PN address relative value is generated to control the ROM address so as to set the ROM address to an optimum address value for tracking the path.

Therefore, it becomes possible to precisely and easily set the chip phase of the PN code at adequate timings according to the time positions of the paths to be tracked for each of the digital data demodulators 31, 32, 33 and always attain the high quality RAKE reception. Further, it is possible to attain the high-speed response in any path position with a relatively simple construction.

Second Embodiment

In a second embodiment of this invention, one PN code ROM is commonly provided for a plurality of digital data demodulators. The ROM address generators of the digital data demodulators are used to access the PN code ROM so as to generate PN codes.

FIG. 7 is a circuit block diagram showing the construction of a main portion of the reception system of a spread spectrum radiocommunication device according to this embodiment. In FIG. 7, portions which are the same as those of FIG. 1 are denoted by the same reference numerals and the detail explanation therefor is omitted.

The communication device of this embodiment includes one PN code ROM 60. The PN code ROM 60 previously stores PN codes whose period is set to $2^{15}$ as shown in FIG. 3.

ROM address generators 315, 325, 335 are provided in three digital data demodulators 71, 72, 73. The ROM address generators 315, 325, 335 independently generate ROM addresses in synchronism with clocks created in the respective digital data demodulators 71, 72, 73. The generated ROM addresses are supplied to the PN code ROM 60 via an external address bus. A PN code read out from the PN code ROM 60 in response to the received address is input to multipliers 312, 322, 332 of the digital data demodulators 71, 72, 73 via an external data bus.

Figure 8:
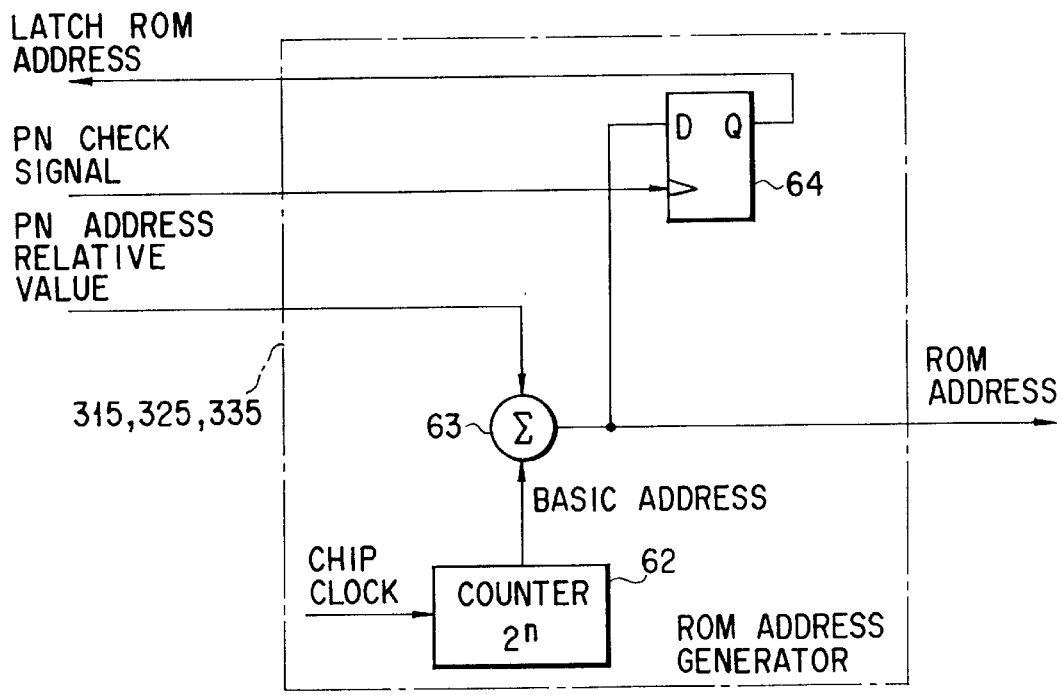
FIG. 8 is a circuit block diagram showing the construction of a PN code generator in the device of FIG. 7.

FIG. 8 is a circuit block diagram showing the construction of the ROM address generators 315, 325, 335. That is, each of the ROM address generators 315, 325, 335 includes an address counter 62 for generating a basic address, an address adder 63 for adding a PN address relative value output from the control section 5 to the basic address generated from the address counter 62 and an address latch circuit 64. That is, it has the same construction as that obtained by omitting the PN code ROM 61 from the PN code generator shown in FIG. 2.

With the above construction, in the ROM address generators 315, 325, 335 of the digital data demodulators 71, 72, 73, ROM addresses used for tracking desired paths according to the specification of the control section 5 are independently generated. The ROM addresses are supplied to the PN code ROM 60 via the external address bus. The ROM address generators 315, 325, 335 are operated by the inherent clocks. Therefore, the possibility that the generation timings of the ROM addresses coincide with each other is weak. However, in order to cope with a case wherein the generation timings of the ROM addresses coincide with each other, it is preferable to provide an arbitration circuit on the external address bus or in the PN code ROM 60.

When the ROM address is supplied, a PN code is read out from the PN code ROM 60 in the chip phase corresponding to the ROM address. The PN code is supplied to a corresponding one of the multipliers 312, 322, 332 of the digital data demodulators 71, 72, 73 via the external data bus. As a result, in the multiplier 312, 322, 332, the inverse spreading process for the reception signal is effected based on the PN code to demodulate the reception wave of each path.

Thus, also in this embodiment, like the first embodiment, it becomes possible to precisely and easily set the chip phase of the PN code at adequate timings according to the position of the path to be tracked for each of the digital data demodulators 71, 72, 73 and always attain the high quality RAKE reception. Further, according to this embodiment, since the PN code ROM 60 is commonly provided for the three digital data demodulators 71, 72, 73, the number of ROMs or the capacity of the ROM can be reduced in comparison with a case wherein the PN code ROMs are provided for the respective digital data demodulators, and as a result, the circuit construction can be made small and the cost can be lowered.

Third Embodiment

In the spread spectrum radiocommunication device, it is important to quickly set up the PN code synchronization at the time of starting of the communication. As the initial capturing system of the PN code, a system of detecting the code position by use of a search receiver and a system of selecting one of a plurality of digital data demodulators independently operated and setting up the initial synchronization for the PN code by use of the sliding correlation method are generally provided.

This embodiment is obtained by applying this invention to the system of detecting the code position by use of a search receiver. As shown in FIG. 9, the search receiver includes a PN code generator 20, multiplier 21, integrating damp filter 22, and squaring circuit 23. As shown in FIG. 10, the PN code generator 20 includes a PN code ROM 201, address counter 202 and address adder 203. PN codes whose period is set to $2^{15}$ are previously stored in the PN code ROM 201. The address counter 202 generates a basic address which changes from 0 to $(2^{15}-1)$ by counting the chip clock. The address adder 203 adds a PN address relative value supplied from the control section (not shown) to the basic address and supplies the result of addition to the PN code ROM 201 as a ROM address.

With the above construction, when a signal transmitted from the base station is searched, the control section first gives a PN address relative value "0" to the PN code generator 20. Therefore, the basic address generated from the address counter 202 is supplied as a readout address to the PN code ROM 201 as it is, and as a result, a PN code is read out from the PN code ROM 201 according to the above basic address. At this time, in the search receiver, eight symbols of the reception signal which is inversely spread by the PN code are integrated by the integrating damp filter 22 and the integrated value, that is, the output of correlation between the reception signal and the PN code is squared by the squaring circuit 23 to be converted into an electric power value and then input to the control section. The control section stores the received electric power value.

Next, the control section sets the PN address relative value to "1" and supplies the value to the PN code generator 20. In the PN code generator 20, a ROM address obtained by adding the PN address relative value "1" to the basic address is generated and a PN code is read out from the PN code ROM 201 according to the above ROM address. At this time, in the search receiver, eight symbols of the reception signal which is inversely spread by the PN code are integrated by the integrating damp filter 22 and the integrated value, that is, the output of correlation between the reception signal and the PN code is squared by the squaring circuit 23 to be converted into an electric power value and then input to the control section. The control section stores the received electric power value.

In the same manner as described above, the control section reads out and stores the electric power value of the output of correlation between the reception signal and the PN code each time the PN address relative value is changed. Then, the control section selects the largest one of the received electric power values stored therein and treats the ROM address for the largest electric power value as initial synchronization information.

With the above construction, the chip phase of the PN code to be generated can be specified extremely easily and precisely and the initial synchronization operation can be stably effected.

Fourth Embodiment

The fourth embodiment of this invention is obtained by applying this invention to a system for setting up the initial synchronization by use of the sliding correlation method.

Figure 11:
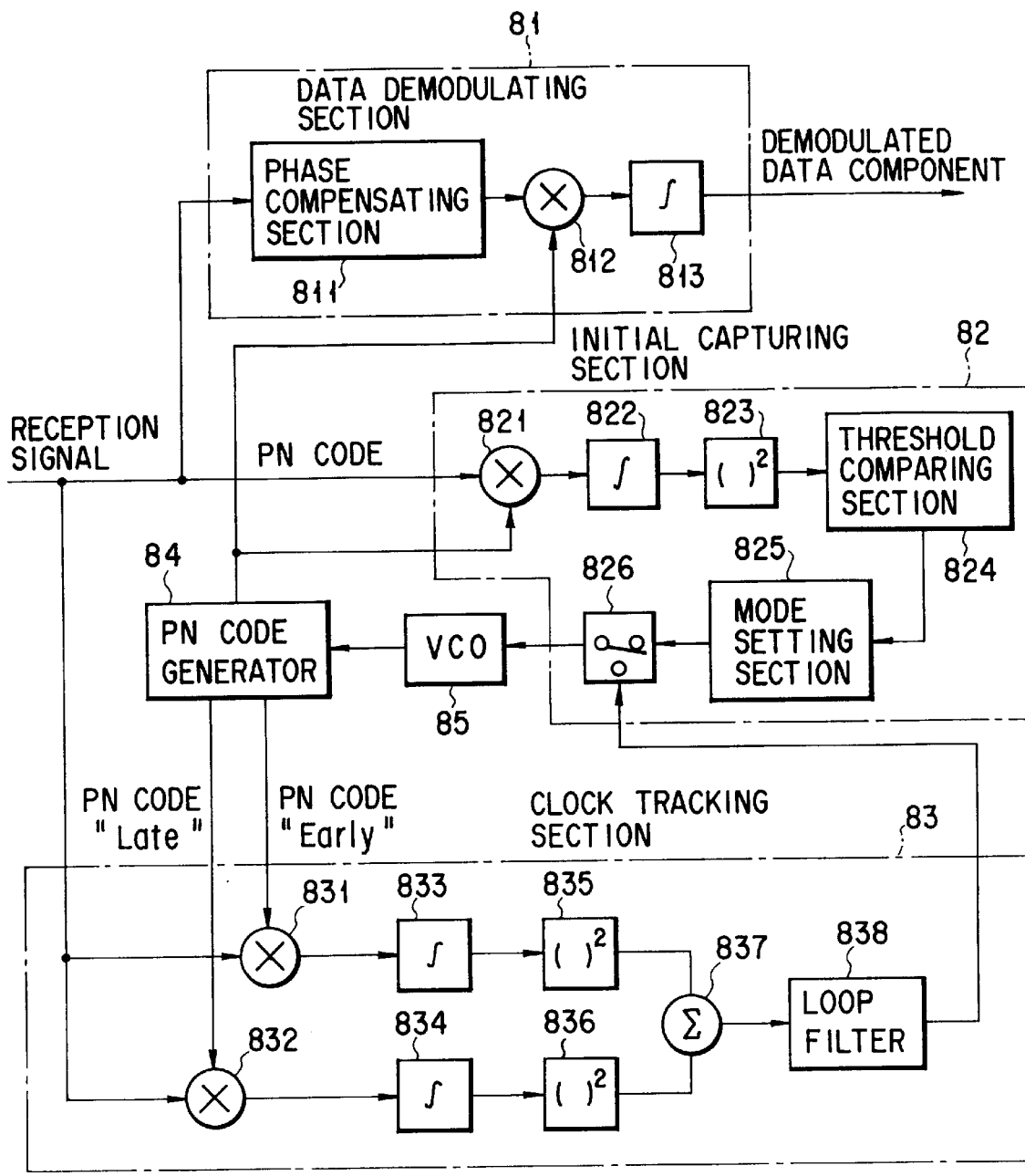
FIG. 11 is a circuit block diagram showing the construction of a digital data demodulator of a spread spectrum radiocommunication device according to a fourth embodiment of this invention.

FIG. 11 is a circuit block diagram showing the construction of a digital data demodulator of a spread spectrum radiocommunication device according to this embodiment. The digital data demodulator includes a data demodulating section 81, an initial capturing section 82, a clock tracking section 83, a PN code generating section 84 having a PN code ROM, and a voltage controlled oscillator (VCO) 85.

The data demodulating section 81 compensates for the phase of the reception signal in a phase compensating section 811, inversely spreads the reception signal by multiplying the same by a PN code generated from the PN code generator 84 in a multiplier 812, and integrates an output signal thereof in an accumulator 813 so as to reproduce a demodulated data component.

The initial capturing section 82 effects the initial capturing operation for PN code synchronization by use of the sliding correlation method, shifts the generated phase of the PN code by ¼ to 1 chip each time the integrated value of a preset number of symbols of the reception signal is derived and causes the clock tracking section 83 to effect the synchronization capturing operation when a received electric power level of preset level or more is observed.

That is, the reception signal is multiplied by the PN code generated from the PN code generator 84 in a multiplier 821 so as to be inversely spread. A preset number of symbols of the output signal are integrated in an integrating damp filter 822. Then, the integrated value, that is, the output of correlation between the reception signal and the PN code is squared by a squaring circuit 823 to be converted into an electric power value, then input to a threshold comparing section 824 and compared with the threshold value in the threshold comparing section 824. A mode setting section 825 sets the initial capturing mode and sets a selection switch 826 on the initial capturing section 82 side in a period before the received electric power value larger than the threshold value is detected in the threshold comparing section 824. On the other hand, if the received electric power value larger than the threshold value is detected, the mode is changed from the initial capturing mode to the clock tracking mode and the selection switch 826 is set on the clock tracking section 83 side.

The clock tracking section 83 effects the clock tracking operation as follows by using the PN code "Early" and PN code "Late" generated from the PN code generator 84 separately from the PN code.

Figure 12:
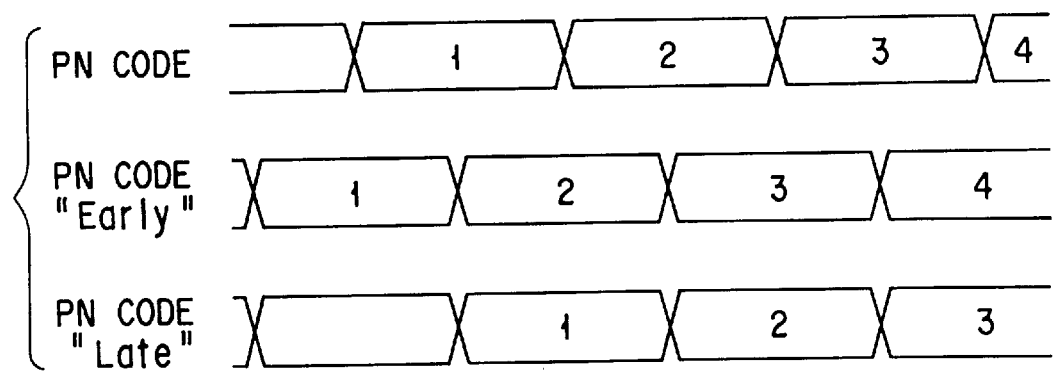
FIG. 12 is a diagram showing the phase relation between three types of PN codes output from the PN code generator of the digital data demodulator shown in FIG. 11.

That is, the PN code "Early" whose phase advances by ½ chip with respect to the PN code supplied to the initial capturing section 82 and the PN code "Late" whose phase is delayed by ½ chip are output from the PN code generator 84. FIG. 12 shows the phase relation of the above PN codes. The reception signal is multiplied by the PN code "Early" and PN code "Late" in multipliers 831 and 832, respectively, and inversely spread, and then preset numbers of symbols of the respective output signals are integrated by integrating damp filters 833 and 834, respectively. After this, the integrated values, that is, the outputs of correlation between the reception signal and the PN code "Early" and PN code "Late" are respectively squared by squaring circuits 835 and 836 to be converted into electric power values and then added together in an adder 837. The added output signal is smoothed in a loop filter 838 and supplied as a signal for variably specifying the clock phase to the voltage controlled oscillator (VCO) 85 via the selection switch 826.

Figure 13A:
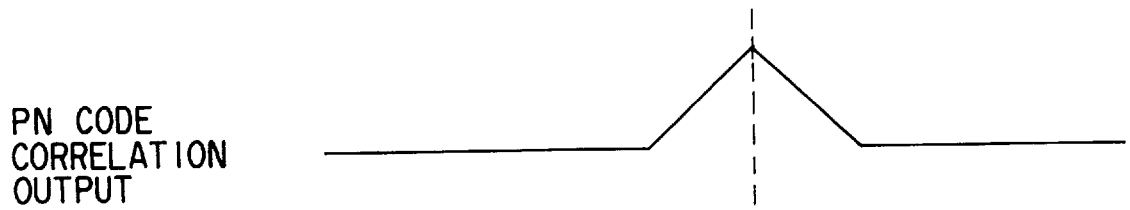
FIG. 13A is a diagram showing the PN code correlation output waveform for illustrating the clock tracking operation by the digital data demodulator shown in FIG. 11.
Figure 13B:
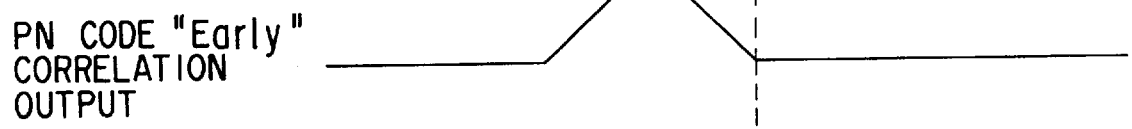
FIG. 13B is a diagram showing the PN code "Early" correlation output waveform for illustrating the clock tracking operation by the digital data demodulator shown in FIG. 11.
Figure 13C:
FIG. 13C is a diagram showing the PN code "Late" correlation output waveform for illustrating the clock tracking operation by the digital data demodulator shown in FIG. 11.
Figure 13D:
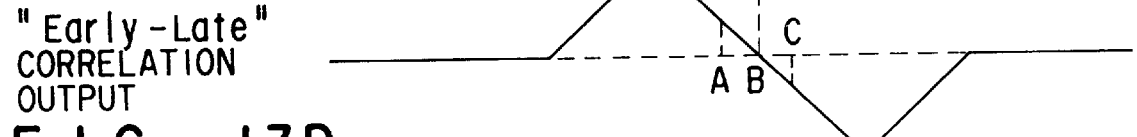
FIG. 13D is a diagram showing the "Early-Late" correlation output waveform for illustrating the clock tracking operation by the digital data demodulator shown in FIG. 11.

FIGS. 13A to 13D show one example of signal waveforms obtained in the initial capturing section 82 and clock tracking section 83. FIG. 13A shows the electric power value of a PN code correlation output supplied from the squaring circuit 823 of the initial capturing section 82 when the phase of the PN code generated from the PN code generator 84 coincides with the phase of the PN code of the reception signal. FIGS. 13B and 13C respectively show the electric power values of PN code correlation outputs supplied from the squaring circuits 835 and 836 of the clock tracking section 83 when the phases of the PN code "Early" and PN code "Late" coincide with the phase of the PN code of the reception signal, and FIG. 13D shows the electric power value of a correlation output supplied from the adder 837 of the clock tracking section 83.

With the above construction, if the electric power value of the correlation output supplied from the adder 837 of the clock tracking section 83 is set in the position "A" in FIG. 13D, a specifying signal for delaying the clock phase is supplied from the clock tracking section 83 to the VCO 85. Therefore, the phase of the PN code generated from the PN code generator 84 is shifted in a lag direction and the correlation output level of the adder 837 moves from the position "A" to the position "B". On the other hand, if the electric power value of the correlation output of the adder 837 is set in the position "C" in FIG. 13D, a specifying signal for advancing the clock phase is supplied from the clock tracking section 83 to the VCO 85. Therefore, the phase of the PN code generated from the PN code generator 84 is shifted in a leading direction and the correlation output level of the adder 837 moves from the position "C" to the position "B".

As is clearly seen from FIG. 13A, the position "B" is a position in which the output level of a demodulated data component output from the accumulator 813 of the data demodulator 81 becomes maximum. The clock tracking section 83 controls the phase of the PN code generated from the PN code generator 84 via the VCO 85 to set the peak value of the correlation output level of the adder 837 closer to the position "B".

With the above construction, synchronization of the PN code with the reception signal can be rapidly and precisely set up. Further, since the PN code ROM having PN codes previously stored therein is used in the PN code generator 84, the phase of the PN code can be easily and precisely controlled.

Next, time for the code synchronization capturing operation by the initial capturing system using the sliding method is calculated. Assume now that the spread code length is $2^{15}$, the chip clock frequency is 1.23 MHz, the symbol clock frequency is 19.2 kHz, the threshold comparison is effected in the threshold comparing section 824 for each symbol and the phase of the PN code is shifted by ½ chip at a time in the VCO 85. Then, the maximum value Tsmax of the code synchronization capturing time is obtained as follows.

$$Tsmax=2^{15} \times 2 \times 64/1.23 \text{ MHz}=3.4 \text{ sec.}$$

Further, the average value Tsavl of code synchronization capturing time becomes 1.7 sec.

In the initial synchronization capturing system using the search receiver described in the third embodiment, it is necessary to change the PN address relative value by $2^{15}$ times corresponding to the PN code length. Therefore, if the chip clock frequency is set to 1.23 MHz and the symbol clock frequency is set to 19.2 kHz like the above condition, time of $2^{15} \times 64 \times 8/1.23$ MHz=13.6 sec becomes necessary in order to effect the 8-symbol length searching operation and becomes longer in comparison with a case using the sliding method.

Fifth Embodiment

A fifth embodiment of this invention is made by improving the fourth embodiment with much attention given to the fact that the PN code ROM is used in the PN code generator, and in this embodiment, the memory area for PN codes in the PN code ROM is divided into three areas, the three digital data demodulators are all operated at the time of initial capturing operation, and the digital data demodulators effect the sliding correlation method based on the PN codes in the respective three divided memory areas.

Figure 14:
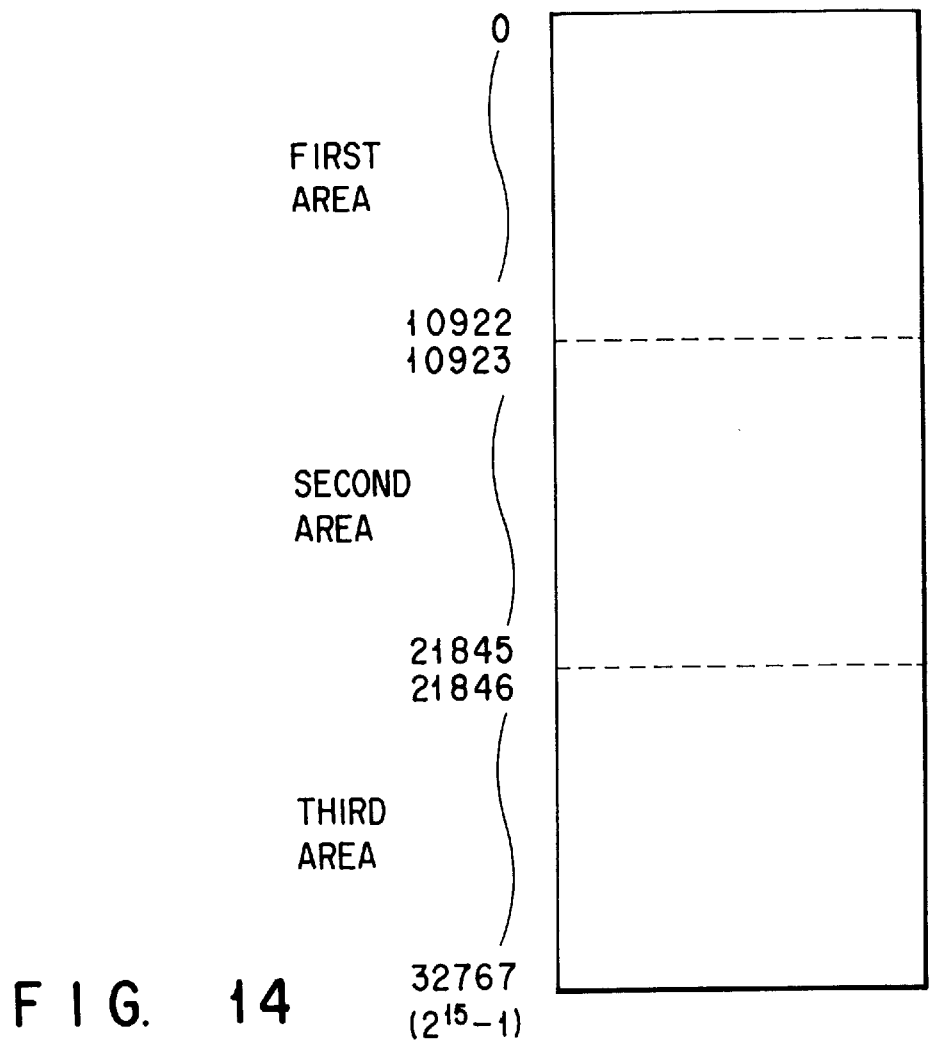
FIG. 14 is a diagram showing the construction of a memory space of a PN code ROM according to a fifth embodiment of this invention.

That is, as shown in FIG. 14, the PN code ROM is divided into three areas including a first area having addresses "0" to "10922", a second area having addresses "10923" to "21845", and a third area having addresses "21846" to "32767 ($2^{15}$−1)".

A spread spectrum radiocommunication device of this embodiment includes three digital data demodulators 71 to 73 independently operated as shown in FIG. 7, for example. The digital data demodulators 71 to 73 designate the addresses of the respective areas of the PN code ROM 60 in parallel at the time of initial capturing operation to read out PN codes and then effect the sliding correlation method based on the PN codes.

For example, the digital data demodulator 71 designates the address starting from the head address "0" of the first area of the PN code ROM 60 and effects the sliding correlation method based on the PN code thereof, the digital data demodulator 72 designates the address starting from the head address "10923" of the second area of the PN code ROM 60 and effects the sliding correlation method based on the PN code thereof, and the digital data demodulator 73 designates the address starting from the head address "21846" of the third area of the PN code ROM 60 and effects the sliding correlation method based on the PN code thereof.

With the above construction, the sliding correlation methods are effected in parallel based on the PN codes of the three different areas of the PN code ROM 60 by use of the three digital data demodulators 71 to 73. Therefore, average time required for initial capturing can be reduced to ⅓ times the average time required when one of the three digital data demodulators 71 to 73 is selected and the initial capturing is effected by the selected demodulator. In the condition described in the fourth embodiment, the maximum value Tsmax of the code synchronization capturing time becomes Tsmax=1.1 sec.

As setting means for setting the areas of the PN code ROM 60 whose addresses are designated by the digital data demodulators 71 to 73, it is considered to use a method for previously setting the count values of the address counters 62 provided in the respective ROM address generators 315, 325, 335 according to the addresses of the respective areas or a method for previously setting PN address relative values output from the control section according to the addresses of the respective areas.

Sixth Embodiment

A sixth embodiment of this invention is an example of the improvement of the PN code generator. That is, a general ROM can generally store data of one byte (8 bits) in one address area, but in the PN code generators 313 to 333 described in the first embodiment, a PN code of only one bit is stored in one address area of the PN code ROM 61 as shown in FIG. 3. That is, only ⅛ of the entire memory capacity of the ROM is used.

Figure 15:
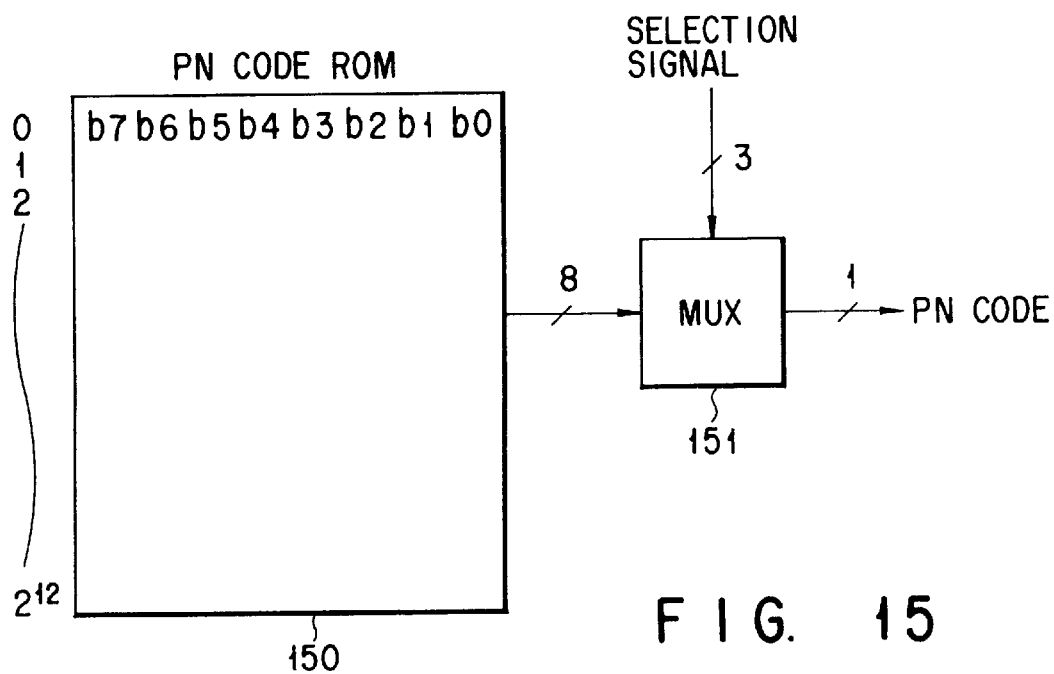
FIG. 15 is a diagram showing the construction of a main portion of a PN code generator according to a sixth embodiment of this invention.

Therefore, in this embodiment, as shown in FIG. 15, PN codes of 8 bits are stored in respective address areas (b0, b1, . . . , b7) of a PN code ROM 150. Then, a PN code is read out in the unit of 8 bits by supplying m high order bits of the readout address to the PN code ROM and input to a multiplexer 151. The multiplexer 151 is supplied with three low order bits of the readout address as a selection signal. Therefore, the PN code of 8 bits is selectively and sequentially read out starting from a freely selected bit for each bit from the multiplexer 151 in response to the selection signal.

With the above construction, since the PN codes of 8 bits can be stored in the respective address areas of the PN code ROM, the memory area can be efficiently used and the required memory capacity of the PN code ROM can be reduced. In a case wherein PN codes whose period is set to $2^{15}$ are stored, it is sufficient if a memory capacity of $2^{12}$ bytes is used and the size of the PN code ROM can be significantly reduced in comparison with a case wherein a memory capacity of $2^{15}$ bytes is necessary (FIG. 3).

This invention is not limited to the above embodiments. For example, in the above embodiments, a case wherein the three digital data demodulators are used is explained, but this invention can also be applied to a case wherein four or more digital data demodulators are used. Further, as memory means for storing PN codes, another type of memory element different from the ROM, for example, an $E^2PROM$, RAM, IC card memory or flash memory can be used.

Further, the construction of the readout address generating means, the control contents of the address control means, the procedure and control contents of the initial capturing control, the construction of the radiocommunication device, the types of the radiocommunication system to which this invention can be applied and the like can be variously modified without departing from the technical scope of this invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A spread spectrum radiocommunication device comprising:

a spread code memory for storing spread codes;

a plurality of digital data demodulating circuits for independently demodulating multipath radio signals transmitted via a radio channel, each digital data demodulating circuit comprising a readout address generating circuit for generating and supplying readout addresses to said spread code memory to read out the spread codes; and an address control circuit changing the readout addresses generated by the readout address generating circuits of said digital data demodulators based on differences between readout addresses generated by the address generating circuits and target addresses in order to cause chip phases of the spread codes read out from the spread code memory to coincide with chip phases of the multipath radio signals.

2. The spread spectrum radiocommunication device according to claim 1, wherein each said readout address generating circuit comprises:

a basic address counter;

an adding circuit for adding a basic address generated by said basic address counter and an address relative value supplied from said address control circuit, the address relative value determined by the difference between one of the addresses generated by the corresponding address generating circuit and one of the target addresses, wherein an output of said adding circuit is supplied to said spread code memory.

3. The spread spectrum radio communication device according to claim 1, wherein each of said digital data demodulators further comprises a latch circuit for latching one of the addresses generated by the corresponding address generating circuit, wherein said address control circuit changes the readout addresses generated by the readout address generating circuits based on differences between the readout addresses stored in said latch circuits of said digital data demodulators and the target addresses.

4. A spread spectrum radiocommunication device comprising:

a plurality of digital data demodulating circuits for independently demodulating multipath radio signals transmitted via a radio channel, each digital data demodulating circuit comprising:

a spread code memory for storing spread codes used to demodulate the multipath radio signals; and a readout address generating circuit for generating and supplying readout addresses to said spread code memory to read out the spread codes; and an address control circuit for changing the readout addresses generated by the readout address generating circuits of said digital data demodulators based on differences between readout addresses generated by the readout address generating circuits and target addresses in order to cause chip phases of the spread codes read out from the spread code memories to coincide with chip phases of the multipath radio signals.

5. The spread spectrum radiocommunication device according to claim 4, wherein each said readout address generating circuit comprises:

a basic address counter;

an adding circuit for adding a basic address generated by said basic address counter and an address relative value supplied from said address control circuit, the address relative value determined by the difference between one of the addresses generated by the corresponding address generating circuit and one of the target addresses, wherein an output of said adding circuit is supplied to the corresponding spread code memory.

6. The spread spectrum radio communication device according to claim 4, wherein each of said digital data demodulators further comprises:

a latch circuit for latching one of the addresses generated by the corresponding address generating circuit, wherein said address control circuit changes the readout addresses generated by the readout address generating circuits based on differences between the readout addresses stored in said latch circuits of said digital data demodulators and the target addresses.

7. A spread spectrum radiocommunication device comprising:

a pilot signal demodulating circuit for demodulating a pilot signal transmitted from a transmission side via a radio channel to detect a reception level of a received signal;

spread code storing means storing spread code series required for said pilot signal demodulating circuit to demodulate the pilot signal;

a readout address generating circuit for supplying a readout address to said spread code storing means to read out the spread code series starting from a desired chip phase and supplying the same to said pilot signal demodulating circuit; and a search control circuit for monitoring the reception level detected by said pilot signal demodulating circuit and stepwise controlling the value of a readout address which said address generating circuit supplies to said spread code storing means, based on a difference between the readout address and a target address corresponding to the pilot signal.

8. A spread spectrum radiocommunication device comprising:

a plurality of digital data demodulating circuits for independently demodulating multipath radio signals transmitted via a radio channel for respective paths;

spread code storing means storing spread code series required for said digital data demodulating circuits to demodulate the multipath radio signals;

a plurality of readout address generating circuits respectively provided for said plurality of digital data demodulating circuits, for generating and supplying readout addresses to said spread code storing means to read out the spread code series starting from desired chip phases and respectively supply the same to said digital data demodulating circuits; and an address control circuit for changing readout addresses generated from said plurality of readout address generating circuits based on differences between the readout addresses generated by said plurality of readout address generating circuits and target addresses in order to cause the chip phases of the spread code series supplied from said spread code storing means to said plurality of digital data demodulating circuits to coincide with the reception phases of paths to be tracked.

9. The spread spectrum radiocommunication device according to claim 8, wherein said address control circuit includes means for fetching the readout addresses generated from said plurality of readout address generating circuits at desired timings, deriving readout address relative values corresponding to the differences between the respective fetched readout addresses and target readout addresses corresponding to the reception phases of respective paths to be tracked and respectively supplying the readout address relative values to said readout address generating circuits; and each of said plurality of readout address generating circuits includes a basic address generating circuit for generating a basic address, and adds the readout address relative value supplied from said address control circuit to the basic address generated from said basic address generating circuit and supplies the added value to said spread code storing means as a changed readout address.

10. The spread spectrum radiocommunication device according to claim 9, wherein said address control circuit creates a target readout address corresponding to the reception phase of each path to be tracked based on the result of reception of a pilot signal transmitted from the transmission side.

11. The spread spectrum radiocommunication device according to claim 9, wherein said address control circuit sets the reception phase of a to-be-tracked path approximately equal to the chip phase of the spread code series when the reception phase of the path is not synchronized with the chip phase of the spread code series and creates a target readout address corresponding to the approximate value of the reception phase; and each digital data demodulating circuit includes a clock tracking circuit for compensating for a phase difference of less than one chip of the chip phase of the to-be-tracked path with respect to the chip phase of the spread code series.

12. The spread spectrum radiocommunication device according to claim 8, wherein said spread code storing means includes a memory storing spread code series in the unit of n bits in each address area, and means for serially outputting the spread code series of n bits read out in parallel from one of the address areas of said memory bit by bit from a desired bit position.

13. The spread spectrum radiocommunication device according to claim 8, wherein said spread code storing means includes a plurality of memories respectively provided for said plurality of readout address generating circuits and each of said plurality of readout address generating circuits generates a readout address and supplies the readout address to a corresponding one of said memories.

14. The spread spectrum radiocommunication device according to claim 8, wherein at least one of said plurality of digital data demodulating circuits includes:

a data demodulating circuit for demodulating the reception signal of a desired path of the multipath radio signal to reproduce reception data;

an initial capturing circuit for monitoring the output level of a correlation between the reception signal of the desired path and the spread code series read out from said spread code storing means to detect the chip phase of the spread code series which causes the correlation output level to be set higher than a preset level; and a clock tracking circuit for starting the clock tracking operation when the chip phase of the spread code which causes the correlation output level to be set higher than a preset level is detected by said initial capturing circuit and controlling at least one of the frequency and phase of the clock used by a corresponding one of said readout address generating circuits to increase the output level of correlation between the spread code series and the reception signal to a maximum value.

15. The spread spectrum radiocommunication device according to claim 14, wherein said initial capturing circuit repeatedly effects the operation for detecting the output level of correlation between the reception signal of a desired path and the spread code series read out from said spread code storing means for every preset number of symbols to detect the chip phase of the spread code series which causes the correlation output level to be set higher than a preset level and the operation for supplying a specification for changing the readout address to said readout address generating circuit to shift the chip phase of the spread code series read out from said spread code storing means by a preset amount each time the correlation output level is detected.

16. The spread spectrum radiocommunication device according to claim 14, wherein the memory area contained in said spread code storing means is divided into a plurality of divided memory areas corresponding in number to said readout address generating circuits, said plurality of readout address generating circuits respectively access said plurality of divided memory areas in parallel to read out spread code series from said divided memory areas, and said plurality of digital data demodulating circuits effect the initial capturing operation and clock tracking operation in parallel by use of the spread code series read out from said divided memory areas.

17. A spread spectrum radiocommunication device comprising:

a plurality of digital data demodulating circuits for independently demodulating multipath radio signals transmitted via a radio channel for respective paths;

spread code storing means storing spread code series required for said digital data demodulating circuits to demodulate the multipath radio signals;

a plurality of readout address generating circuits respectively provided for said plurality of digital data demodulating circuits, for generating and supplying readout addresses to said spread code storing means to read out the spread codes series starting from desired chip phases and respectively supply the same to said digital data demodulating circuits; and an address control circuit for changing the readout addresses generated from said plurality of readout address generating circuits to cause the chip phases of the spread code series supplied from said spread code storing means to said plurality of digital data demodulating circuits to coincide with the reception phases of paths to be tracked, wherein said spread code storing means includes a common memory commonly provided for said plurality of readout address generating circuits and said plurality of readout address generating circuits generate readout addresses at independent timings and supply the readout addresses to said common memory.

18. The spread spectrum radiocommunication device according to claim 17, wherein said common memory includes an arbitration circuit for preventing collision of the readout addresses generated from said plurality of readout address generating circuits.

\* \* \* \* \*